UNITED STATES PATENT OFFICE.

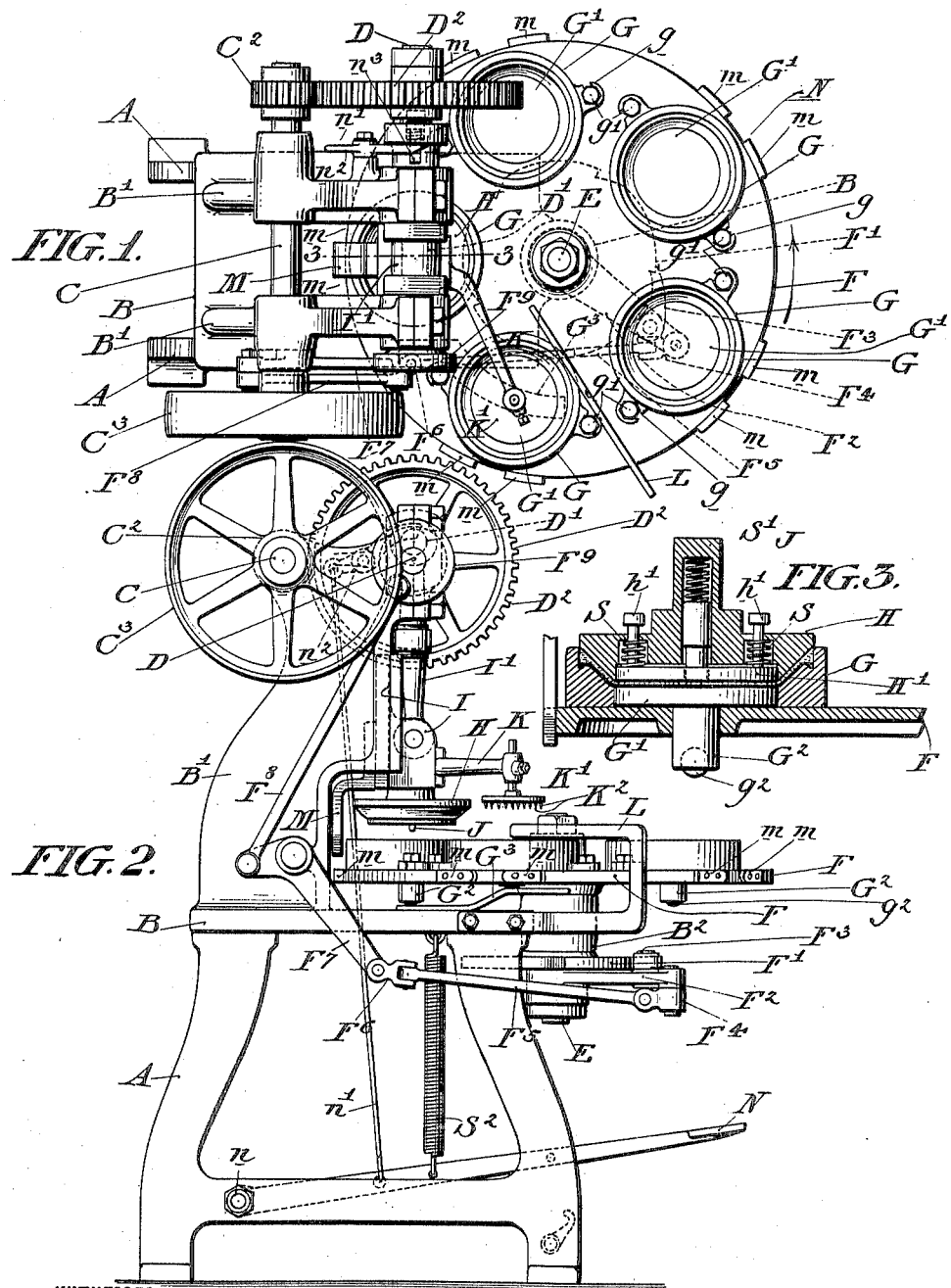

JOSEPH C. HUTCHISON, OF PHILADELPHIA, PENNSYLVANIA.

MACHINE FOR MAKING PIES.

No. 817,483.     Specification of Letters Patent.     Patented April 10, 1906.

Application filed August 14, 1905. Serial No. 274,055.

*To all whom it may concern:*

Be it known that I, JOSEPH C. HUTCHISON, a citizen of the United States, residing at Philadelphia, in the county of Philadelphia and State of Pennsylvania, have invented certain new and useful Improvements in Machines for Making Pies, of which the following is a specification.

My invention relates to machinery for pressing and at the same time rimming crusts to be used in the manufacture of what is known to the trade as a "custard" or "custard-pie;" and it consists in further improvements based upon the machine shown and described in Letters Patent granted to me April 5, 1904, and serially numbered 756,639.

Particularly my object is to manually place upon a revoluble table of the machine a plate containing a cake of dough and by suitable mechanism, hereinafter described, cause the cake of dough to be brought under the action of suitable dies, whereby a crust will be molded having a rim of considerably greater thickness and strength than the body of the crust, to perforate the bottom of the crust to prevent the same from buckling during the process of baking, and to discharge from the machine the plate containing the crust and guide the same to a table placed to receive it.

My invention consists, essentially, in the arrangement and combination of coacting die members and in mechanism for controlling the same, which will be hereinafter described in connection with the drawings and especially pointed out in the claims.

Reference being now had to the drawings in which my invention is illustrated, Figure 1 illustrates a plan view of a machine embodying my invention. Fig. 2 represents a side elevation of the machine, and Fig. 3 shows a vertical section of the dies detached from the machine and in a position to mold a crust and is an enlarged section taken approximately on the line 3 3 of Fig. 1.

A indicates the frame of the machine, forming a support for a bed B, which is integral and with uprights or standards B', which have bearings forming a support for a main driving-shaft C and for a crank-shaft D.

The bed B is provided with a bearing $B^2$ for the reception of a vertical shaft E, upon the upper end of which is mounted a turn-table F and upon the lower end a ratchet-wheel F'. The turn-table is intermittently rotated by means of a lever $F^2$, which is loosely journaled upon the shaft E and has a pawl $F^3$ adapted to engage the teeth of ratchet-wheel F'. This lever is in operative connection with a link $F^4$, which is connected to a rod $F^5$, and the latter by means of a link $F^6$ is connected to the long arm of a bell-crank lever $F^7$. The bell-crank lever receives motion from a crank-disk $F^9$ by means of a connection-rod $F^8$, one end of which is connected to the crank-disk and the other to the short arm of the bell-crank. The turn-table F is provided with a plurality of lower dies or plate-holders G, each of which has lugs $g$ $g$ to receive bolts $g'$ $g'$, by which the die is detachably fastened to the turn-table. The interior of the plate-holders G are fashioned to the contour of the pie-plates, and each is provided at the bottom with an ejecting-plate G', having a stem $G^2$ and a ball-bearing $g^2$, the latter to bear upon a cam-plate $G^3$, which serves to raise the plate at a certain point in its travel.

The upper die H, which I term the "crust-forming" die, is secured to a cross-head I, which is suitably guided in the uprights B' and receives motion from the crank-pin D' of the crank-shaft D by a connecting-rod I'. The shaft D is driven from the shaft C by means of a gear-wheel $D^2$ and pinion $C^2$, the former of which is mounted upon the shaft D and the latter upon the shaft C, which is also provided with a heavy driving-pulley $C^3$. The upper or crust-forming die H is provided with a plate H', held in place by stud-bolts h', around which are spiral springs S to normally press the plate downward, with the object of releasing the crust from the upper die. In addition to this plate I also employ a plunger J, which is adapted to an opening in the center of the die H and is acted upon by a spring S' to depress the plunger in a further effort to prevent the crust from adhering to the die H and to the plate H'. In order to prevent the crust from buckling or blistering during the process of baking, it is necessary to perforate the bottom of the same, which is preferably done after the crust has left the die H. For this purpose I employ an arm K, fastened to the cross-head I and adapted to move up and down with it, and upon the free end of the arm is adjustably secured a plate K', provided with a number of perforating-pins $K^2$, which are brought into engagement with the bottom of the crust when the same is in an elevated position and just prior to its removal by an arm L. This arm, which serves to guide the pie-plate and its contents away from the machine, is fastened to the bed B and is bent outward, upward, and inward to clear the turn-table and the dies thereto attached and is inclined, as shown in Fig. 1, to cause the plates to slide away from the dies as the turn-table rotates.

For the purpose of causing the upper die H to register correctly with one of the lower dies G, I provide the cross-head I with a depending tongue M, tapered at the bottom, so as to pass between plates $m\ m$, fastened upon the edge of the turn-table.

I prefer to use in connection with my machine a clutch mechanism by which the power for operating the several parts may be thrown off the moment the operator leaves the machine, and to accomplish this end I employ a treadle N, fulcrumed at a point $n$ and normally lifted by means of a spiral spring $S^2$, a rod $n'$, extending from the treadle to a latch $n^2$, and a bolt $n^3$, journaled in the shaft D and adapted to be thrown out of engagement with the hub of the gear-wheel $D^2$ by the interposition of said latch.

The operation of my machine is as follows: The operator standing in front of the machine with one foot upon the treadle places in one of the lower dies a plate containing a previously-prepared lump of dough. The turn-table is in due time automatically turned, and the dough is brought under the joint action of the upper and lower dies, where a crust of the requisite thickness is molded and the same provided with a thickened rim, which may be either plain or corrugated, according to the shape of the die. The upper die is then lifted, and the turn-table is again rotated, bringing the stem of the ejecting-plate into contact with an inclined plate or cam placed in its path, whereby the pie-plate and its contents are elevated to a level with the upper surface of the plate-die. The cross-head carrying the upper die again descends, bringing the perforating-plate into engagement with the bottom of the crust. The cross-head is again lifted, and as the turn-table again rotates the pie-plate containing the finished crust is brought in contact with the inclined arm, which presses the same away from the die to a table or any convenient receptacle placed to receive it.

Having described my invention, what I claim, and desire to secure by Letters Patent, is—

1. A machine of the character specified, comprising an upper movable die, a plurality of lower dies mounted upon a rotatable carrier, and provided with movable bottom plates and a cam adapted to raise said bottom plates to eject a pie.

2. A machine of the character specified, comprising a movable crust-forming die, a plurality of lower dies mounted upon a rotatable carrier, bottom plates arranged to move within the lower dies, a cam adapted to move the bottom plates and an arm adapted to move the crusts away from the lower dies.

In testimony whereof I affix my signature in presence of two witnesses.

JOSEPH C. HUTCHISON.

Witnesses:
DAVID S. WILLIAMS,
ARNOLD KATZ.